(12) United States Patent
Todo et al.

(10) Patent No.: US 6,236,867 B1
(45) Date of Patent: May 22, 2001

(54) PORTABLE WIRELESS DEVICE

(75) Inventors: Akira Todo, Saitama; Hiroya Usui, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/181,546

(22) Filed: Oct. 29, 1998

(30) Foreign Application Priority Data

Nov. 5, 1997 (JP) ...................................................... 9-302698

(51) Int. Cl.$^7$ ...................................................... H04Q 7/00
(52) U.S. Cl. ........................................ 455/563; 379/88.16
(58) Field of Search ..................................... 455/563, 564, 455/565, 566, 460, 414; 379/88.16, 67.1

(56) References Cited

U.S. PATENT DOCUMENTS

| | | | |
|---|---|---|---|
| 5,095,503 | * | 3/1992 | Kowalski ............................... 579/59 |
| 5,875,405 | * | 2/1999 | Honda ................................... 455/564 |
| 6,014,555 | * | 1/2000 | Tendler ................................. 455/404 |

* cited by examiner

*Primary Examiner*—Daniel Hunter
*Assistant Examiner*—Nick Corsaro
(74) *Attorney, Agent, or Firm*—Jay H. Maioli

(57) ABSTRACT

In a portable telephone device, a desired telephone number selected by an user from all or a part of telephone directory list is converted into audio data by an audio data converting circuit to transmit it to a communication partner, so that the telephone number corresponding to the audio data can be uttered as a voice at the partner side who receives the audio data. Thereby, a portable telephone device with improved user ability can be realized.

6 Claims, 6 Drawing Sheets

PORTABLE WIRELESS DEVICE

BACKGROUND OF THE INVENTION

1. Field of the Invention

This invention relates to a portable wireless device, and more particularly, is applicable to a portable telephone device.

2. Description of the Related Art

Conventionally, the function of telephone directory is set in a portable telephone device. A user previously registers the names and corresponding telephone numbers of a plurality of communication partners in an internal memory as telephone directory list, so that the user can look up a desired name and corresponding telephone number from the telephone directory list if necessary, and can display it on a predetermined display screen.

By the way, when a communication partner inquires telephone numbers from a user during communication, the user must have read the inquired telephone numbers from the telephone directory list which has been registered in the own portable telephone device by a predetemined operation, display them on the display screen, and than read out the displayed telephone numbers, while looking them, so as to inform the communication partner.

However, since the telephone number is an array of numerals having ten figures, it is difficult to remember the telephone number displayed on the display screen only one look. Thereby, the user has to repeatedly look the display screen of the portable telephone device from the state that the device is on user's ear, and divide the number into three or four figures while checking so as to inform the partner. The user has a lot of trouble and may inform the partner of wrong telephone number.

SUMMARY OF THE INVENTION

In view of the foregoing, an object of this invention is to provide a portable wireless device in which the registered telephone numbers can be informed to a partner without the inconvenient operation for an user.

The foregoing object and other objects of the invention have been achieved by the provision of a portable wireless device comprising: storage means for storing telephone directory list including a plurality of telephone numbers; display means for displaying all or a part of the telephone directory list read from the storage means; selecting means for selecting a desired telephone number among from the telephone directory list displayed on the display means; data converting means for converting data stored in the storage means, the data representing the desired telephone number selected and fixed by said selecting means, into audio data; and transmitting means for transmitting the audio data converted by the data converting means.

As a result, the audio data corresponding to the desired telephone number is transmitted to a communication partner, and the telephone number on the basis of the audio data is uttered as a vocal sound at the communication partner's side. Thus, the trouble such that an user repeatedly looks at the display screen from the state that the portable telephone device is on user's ear can be avoided.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
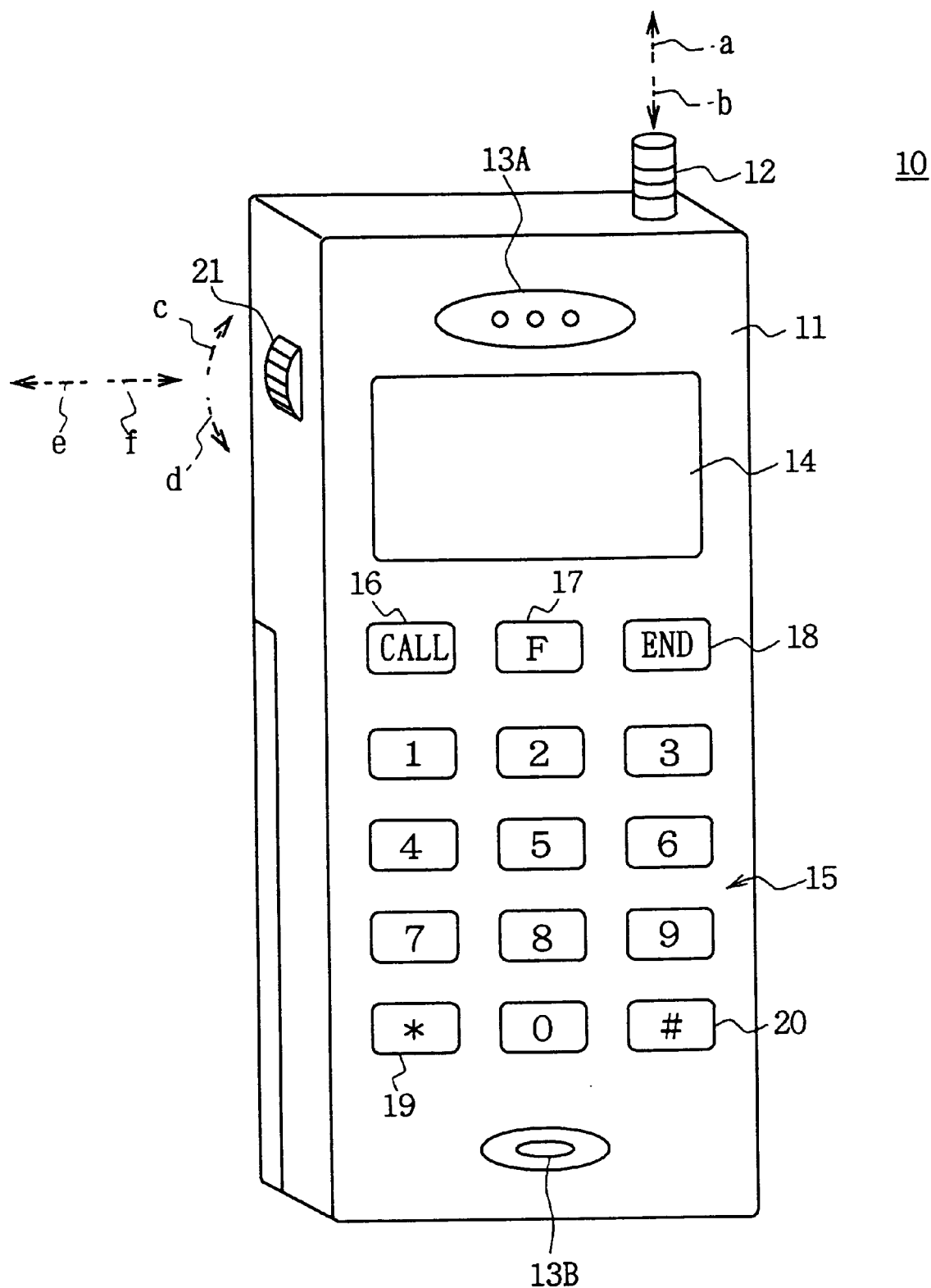
FIG. 1 is a schematic perspective view showing one embodiment of the portable telephone device according to this invention.

Preferred embodiments of this invention will be described with reference to the accompanying drawings:

FIG. 1 shows a portable telephone device 10 according to this invention. The body of the portable telephone device 10 is constructed by a housing case 11 comprising non-conductive materials such as synthetic resin. On the top of the housing case 11, a monopole antenna 12 is provided, which can be extended from the housing case 11 or retracted into the housing case 11 by sliding it in the direction illustrated by an arrow "a" or "b". Via the monopole antenna 12, the transmission signal is transmitted to a base station and is received from the base station.

On the front of the housing case 11, a speaker 13A is provided at the upper position. In the portable telephone device 10, the voice of the communication partner, etc. is output through the speaker 13A. Further, a display unit 14 comprising, for example, liquid crystal display is provided under the speaker 13A. In the portable telephone device 10, various information such as telephone numbers input through numeral keys 15 which will be described later, partner's names and corresponding telephone numbers registered as telephone directory list, the intensity of electrical field, and the rest of battery are displayed on the display unit 14.

Under the display unit 14, operation keys consisting of a call key 16, a function key 17, a call end key 18, numeral keys 15, * key 19, and # key 20 are provided. Various information can be input through these operation keys.

When the call key 16 is pushed, command data showing call can be input, and when the call end key 18 is pushed, command data showing call end can be input. More over, when the function key 17 is pushed together with a desired numeral key 15, call data of various functions prepared in the portable telephone device 10 can be input according to the combination of the numeral key. The numeral key 15 consists of ten keys, "0" to "9", which can input the corresponding numeral data. Accordingly, the numeral key 15 is pushed so as to input the telephone number of the communication partner and start to call. When the * key 19 or the # key 20 is pushed, the corresponding symbol "*" or "#" can be input.

Under the operation keys, a microphone 13B for collecting user's voice is provided. In the portable telephone device 10, the audio signal obtained through the microphone 13B is transmitted to the communication partner so as to talk with the partner.

While, on the left side of the housing case 11, a rotary operation key 21 called jog dial is provided. When the rotary operation key 21 is rotated in the direction illustrated by an arrow "c" or "d", a cursor displayed on the display unit 14 can be moved up and down. A desired item can be selected by the cursor among from the items displayed on the display unit 14. The rotary operation key 21 can be pushed toward the inside of the housing (i.e., in the direction illustrated by an arrow "f"), so as to input the items selected by the cursor.

Figure 2:
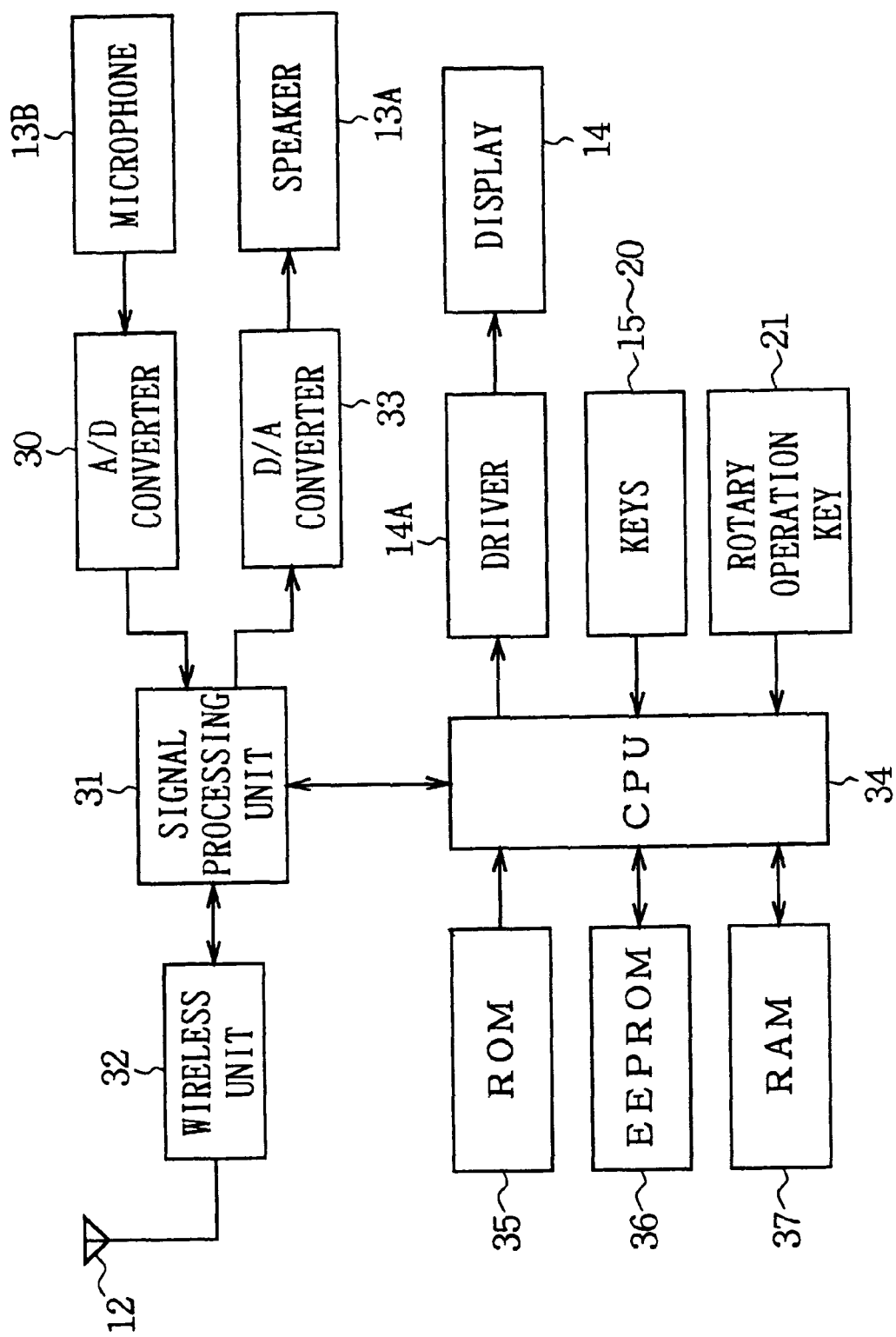
FIG. 2 is a block diagram showing the construction of a circuit provided inside the portable telephone device.

FIG. 2 shows the internal circuit construction of the portable telephone device 10. The audio signal input from an user through the microphone 13B is converted into the digital signal by an analog-to-digital converting unit 30, and then is compressed at a signal processing unit 31. The audio data obtained from the signal processing unit 31 is modulated at a wireless unit 32 to be transmitted to a base station (not shown) via the monopole antenna 12 as transmission signal.

On the other hand, the transmission signal transmitted from the base station is received by the monopole antenna 12, and is demodulated through the wireless unit 32, thereafter extended at the signal processing unit 31. The extended audio data obtained from the signal processing unit 31 is converted into the analog signal by a digital-to-analog converting unit 33, and then is uttered to the outside through the speaker 13A.

The signal processing unit 31 is controlled by a central processing unit (CPU) 34, and communicates with a base station through the wireless unit 32 and the monopole antenna 12. The portable telephone device 10 transfers data with other portable telephone device (not shown) through the base station.

Further, the CPU 34 controls the display unit 14 through a driver 14A to display the data corresponding to the command input from the operation keys 15 to 20 and the rotary operation key 21 on the display unit 14.

Further, the CPU 34 operates based on the programs written in a ROM 35 or an EEPROM 36, and if necessary, reads the data written in a RAM 37 as a retrieval means to execute each processing.

In this case, the audio data corresponding to the name of numerals, "0" to "9" (hereinafter, referred to as numerical audio data) have been written in the ROM 35. The data showing the telephone number assigned to the portable telephone device 10 has been written in the EEPROM 36. The data showing the telephone directory list which is registered by an user has been written in the RAM 37. If necessary, the user can read the data of a desired name and the corresponding telephone number among from the telephone directory list.

Referring to FIG. 1 again, the rotary operation key 21 is provided on the top of left surface of the housing case 11. A user can operate it with a hand holding the housing case 11 as it is.

Figure 3:
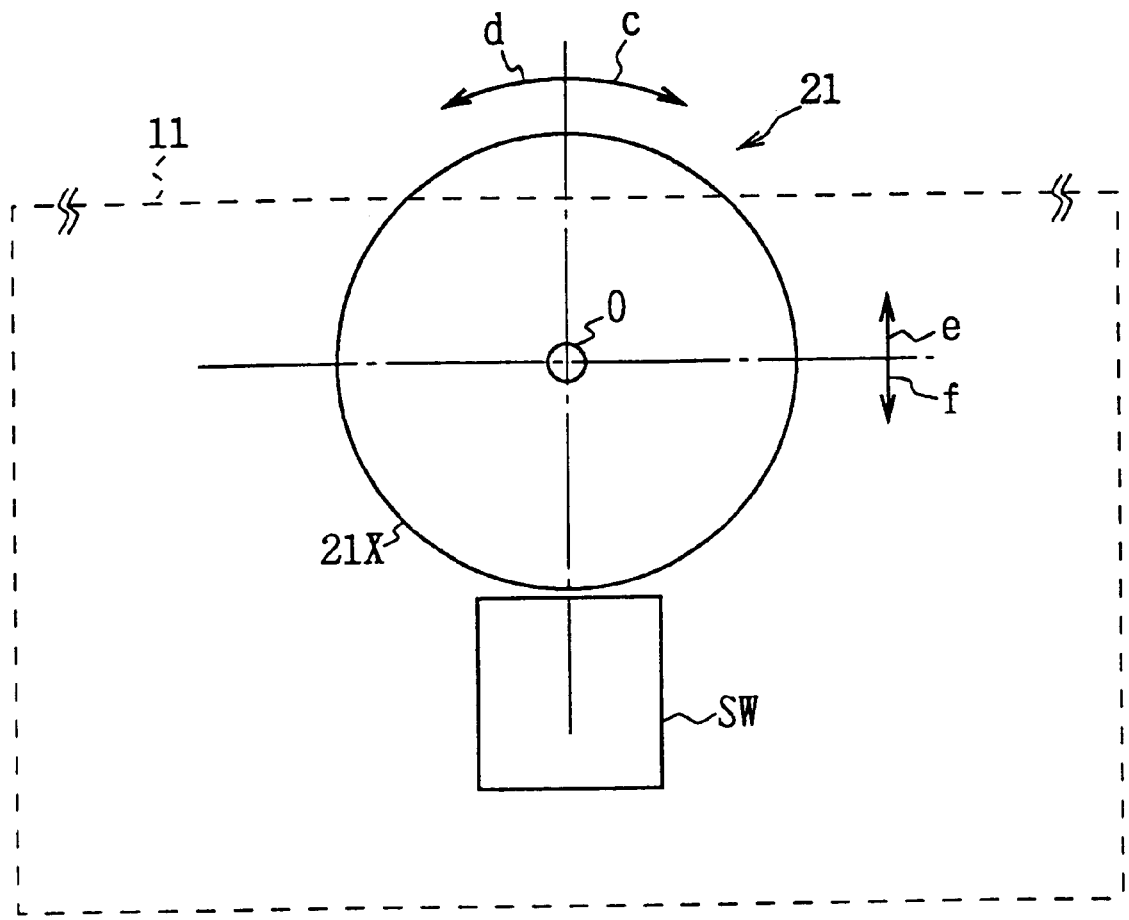
FIG. 3 is a schematic plan view showing the general structure of the rotary operation key.

The rotary operation key 21 can be operated in the direction of circumference and in the radial direction independently. An shown in FIG. 3, the rotary operation key 21 comprises a disk shaped rotary encoder 21X which rotates in the direction of circumference (arrows "c" and "d") with a rotation axis O being centered, a slide board (not shown) sliding in the radial direction (arrows "e" and "f") with the rotary encoder 21X, and a slide switch SW. The slide board and the slide switch SW are spring-biased toward the direction shown by an arrow "e".

The rotation axis O is fixed in respect to the slide board. When the rotary encoder 21X of the rotary operation key 21 is pressed in the direction of arrow "f", the rotary encoder 21X is slid integrally with the slide board to push up the switch SW, which controls the state "ON". The CPU 34 detects the state, "ON" or "OFF", of the switch SW to determine whether or not the rotary operation key 21 is clicked.

Figure 4A:
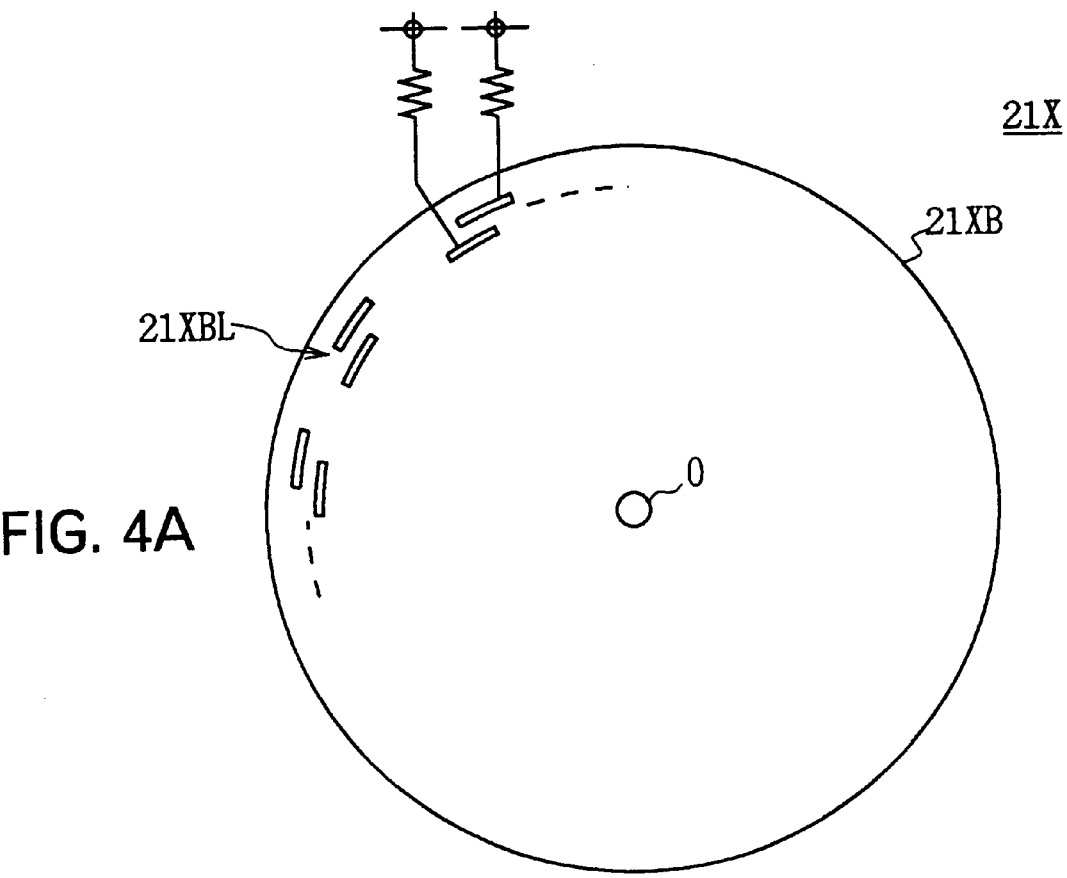
FIGS. 4A and 4B are plan views showing the construction of the rotary encoder.
Figure 4B:
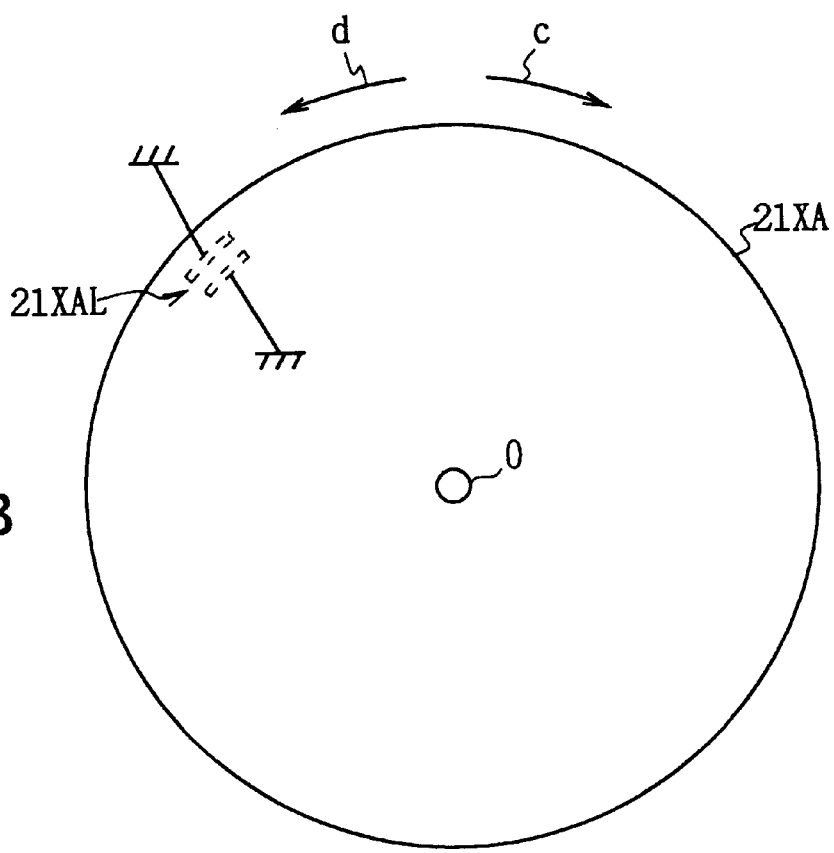

The rotary encoder 21X which is slid integrally with the slide board is, as shown in FIGS. 4A and 4B, constructed by two disks 21XA and 21XB. The disk 21XA is a movable section provided on the disk 21XB, and is attached so as to relatively move in respect to the disk 21XB fixed to the slide board.

A pair of counter-electrodes 21XAL connected to ground is provided on the movable disk 21XA. The counter-electrodes 21XAL is so assembled that it can rub against plural pairs of counter-electrodes 21XBL (e.g., twenty pairs) which are provided along the circumference of the disk 21XB. In connection, the counter-electrodes 21XBL provided on the fixed disk 21XB slightly shifts in the direction of circumference at the position between the inner periphery and the outer periphery.

Figure 5A:
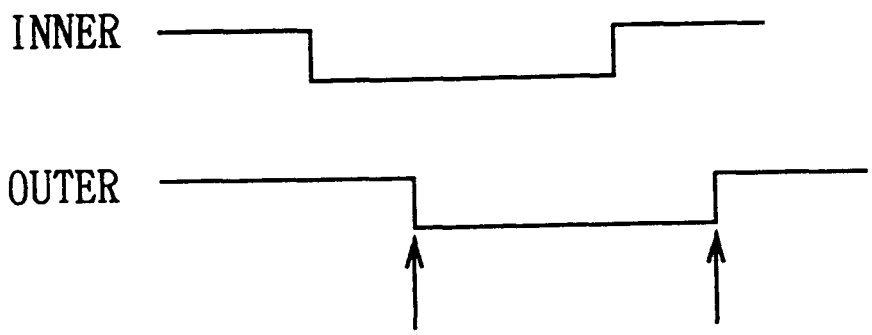
FIGS. 5A and 5B are signal waveform charts showing the output signal waveform from the rotary encoder.
Figure 5B:
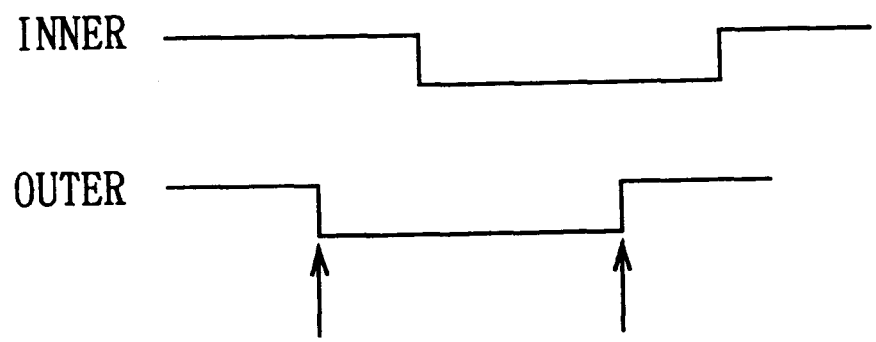

Regarding the potential output from the counter-electrodes, when rotating the rotary operation key 21 in the direction of arrow "c", the potential of the inner periphery first falls to the ground potential as shown in FIG. 5A. While, when rotating the rotary operation key 21 in the direction of arrow "d", the potential of the outer periphery first falls to the ground potential as shown in FIG. 5B. It is detected that which of inner potential or outer potential falls first, so as to detect the rotating direction of the rotary operation key 21. Also, the rotating amount of the rotary operation key 21 can be detected by counting the number of pulse output from the electrodes of outer periphery side.

Next, an example of the operation using the rotary operation key 21 will be explained. In the state that a menu screen is being displayed on the display unit 14, the rotary operation key 21 is operated in the direction of circumference or in the bottom direction (hereinafter, referred to as up operation or down operation), so as to move a cursor displayed on the display unit 14 up and down to select one of displayed items. In connection, the rotary operation key 21 in pushed (hereinafter, referred to as click) in the radial direction in this state, so as to instruct the CPU 34 to read detailed data relating to the item where the cursor positions.

Figure 6:
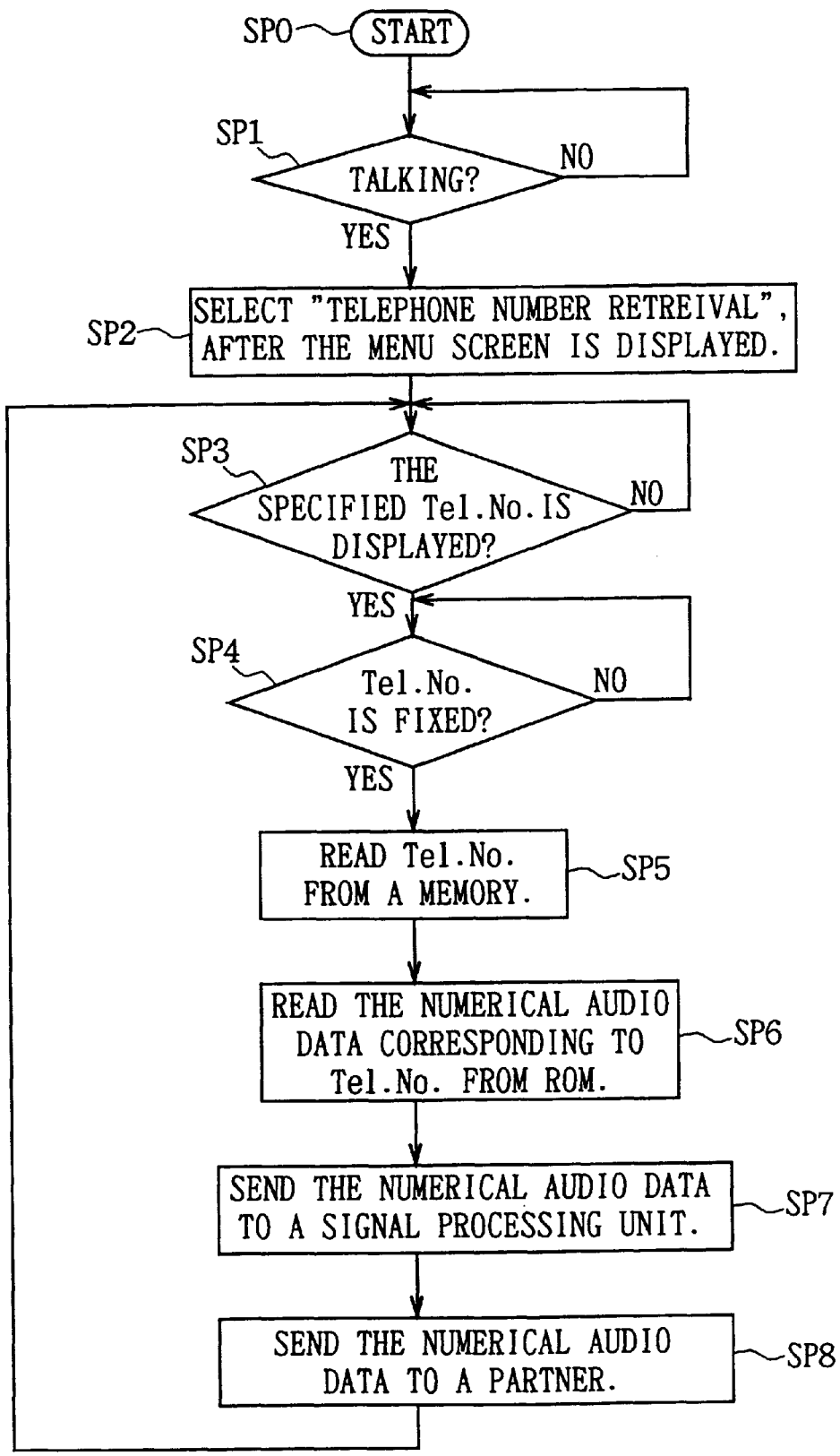
FIG. 6 is a flowchart showing the voice informing procedure of telephone number.

In the portable telephone device 10, when a communication starts at step SP0, the CPU 34 executes the voice informing procedure of telephone number as shown in FIG. 6. The CPU 34, at step SP1, determines whether or not the portable telephone device 10 communicates with a desired partner. If an affirmative result is obtained, the system proceeds to next step SP2.

At step SP2, a user clicks the rotary operation key 21 to display the menu screen on the display unit 14, and meets the cursor on the item "telephone number retrieval" of the menu screen by operating the rotary operation key 21 up and down, and clicks it. Then, it instructs the CPU 34 to read detailed data relating to the item "telephone number retrieval". The CPU 34 sets mode to the mode for finding the name and corresponding telephone number desired by the user (hereinafter, referred to as retrieval mode), thereafter proceeding to step SP3.

At step SP3, when the user operates the rotary operation key 21 up and down to meet the cursor on the item of desired name and corresponding telephone number from the telephone directory list displayed on the display unit 14, the CPU determines whether or not the telephone number on which the cursor meets has been displayed on the display unit 14, and if an affirmative result is obtained, proceeds to step SP4.

At step SP4, the CPU determines whether or not the user has been clicked the item of the name and corresponding telephone number on which the cursor meets, and if an affirmative result is obtained, at step SP5, reads the data showing the telephone number selected from the RAM 37.

Then, the CPU 34, at step SP6, reads the numerical audio data corresponding to each numeral comprising the telephone number from the ROM 35, based on the data showing the telephone number read from the RAM 37, to output it to the signal processing unit 31.

The CPU 34 then controls the signal processing unit 31 so as to make the partner's portable telephone device to transmit the numerical audio data through the wireless unit 32 connected to the signal processing unit 31 and the monopole antenna 12. Thereby, the numerical name corresponding to the numerical audio data are successively uttered as a voice from the speaker of the partner's portable telephone device.

The CPU 34 returns to step SP3 again to set the system to the state that the user can redial or select another telephone number again, and repeats the processes from steps SP3 to SP8 described above to terminate the voice informing procedure of telephone number.

In the above construction, in order to inform a desired telephone number to a communication partner among from the telephone directory list which has been registered in the portable telephone device 10 during talking, a user operates the rotary operation key 21 to display the menu screen on the display unit 14, thereafter, selects the item "telephone number retrieval" from the menu screen to change a mode into the retrieval mode.

Accordingly, the telephone directory list is displayed on the display unit 14. When the user uses the rotary operation key 21 to select a desired name and corresponding telephone number from the telephone directory list, the data showing the selected telephone number is read from the RAM 37, and at the same time, the numerical audio data corresponding to the telephone number is read from the ROM 35 based on the data showing the telephone number.

As a result, the numerical audio data showing the telephone number is transmitted to the partner's portable telephone device, and the numerical name corresponding to the numerical audio data is successively uttered as a voice from the speaker of the portable telephone device.

In this way, the user can inform a communication partner of a desired telephone number, which is converted into a voice, from the telephone directory list which has been registered in the portable telephone device 10. Thereby, when the communication partner inquires telephone numbers during communication, this can avoid a trouble that the user reads and informs the inquired telephone numbers, while repeating the action that the user looks the display unit 14 from the state that the portable telephone device 10 is on the user's ear.

With the above construction, in the portable telephone device 10, the numerical audio data representing the telephone number selected by the user, which has been stored in the ROM 35, is transmitted to the partner's portable telephone device, so that the telephone number on the basis of the numerical audio data can be uttered as a voice at the partner's portable telephone device. In this way, a portable telephone device which is very usable for an user can be realized.

The embodiment described above has been dealt with the case where the CPU 34 transmits the numerical audio data read from the ROM 35 to the signal processing unit 31. However, this invention is not limited to this, but the CPU 34 can transmit the numerical audio data read from the ROM 35 to the analog-to-digital converting unit 30. In addition, direct transmission of the already band-compressed numerical audio data to the signal processing unit 31 makes it possible to save the storage capacity of the ROM 35 for storing the numerical audio data.

Further, the embodiment described above has been dealt with the case where the CPU 34 transmits the numerical audio data read from the ROM 35 to the partner's portable telephone device through the signal processing unit 31. However, this invention is not limited to this, but the CPU 34 can transmit the numerical audio data read from the ROM 35 to the partner's portable telephone device through the signal processing unit 31, after the numerical audio data is converted into digital data through the analog-to-digital converting unit 30.

Further, the embodiment described above has been dealt with the case where the CPU 34 transmits the numerical audio data read from the ROM 35 to the partner's portable telephone device through the signal processing unit 31. However, this invention is not limited to this, but in addition to this processing, the CPU 34 can utter as a voice the telephone number on the basis of the numerical audio data from a speaker, after the numerical audio data read from the ROM 35 is converted into analog data through the digital-to-analog converting unit 33. Thereby, the user also can hear the telephone number on the basis of the numerical audio data as a voice with the communication partner.

Further, the embodiment described above has been dealt with the case where the numerical audio data is stored in the ROM 35, and the numerical audio data showing the telephone number selected by an user is transmitted to the partner's portable telephone device. However, this invention is not limited to this, but the contents of talking is stored in the RAM 35, and the contents can be sent, if necessary, as a voice to the partner's portable telephone device which is currently talking.

In this case, the item "voice memo" is set on the menu screen displayed on the display unit 14. The user selects the item "voice memo" so as to send the voice memo. The user is unnecessary to write down the talking contents on papers, and an inconvenience that the user reads and informs the talking contents can be avoided.

Further, the embodiment described above has been dealt with the case where the numerical audio data is stored in the ROM 35, and the numerical audio data showing the telephone number selected by an user is transmitted to the partner's portable telephone device. However, this invention is not limited to this, but the audio data is stored in the ROM 35 in accordance with the name of the Japanese syllabary from "あ" to "ん", and the audio data showing the name selected by the user can be transmitted to the partner's portable telephone device in addition to or instead of the numerical audio data showing the telephone number.

Further, the embodiment described above has been dealt with the case where the CPU 34 and the ROM 35 are applied as audio data converting means. However, this invention is not limited to this, but the ROM 35 can be stored in the memory of the CPU 34.

Further, the embodiment described above has been dealt with the case where by using the rotary operation key 21 provided in the portable telephone device, an user informs the partner of a desired telephone number converted into a voice from the telephone directory list which has been registered in the portable telephone device 10. However, this invention is not limited to this, but the user can operate it by using other operation keys 15 to 20 other than the rotary operation key 21.

Further, the embodiment described above has been dealt with the case where this invention is applied to the portable telephone device 10. However, this invention is not limited to this, but can be widely applied to other portable wireless devices such as a handset of a cordless telephone device.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A portable wireless device comprising:
   storage means for storing a telephone directory list including a plurality of telephone numbers;
   display means for displaying at least a part of said telephone directory list read from said storage means;
   selecting means for selecting a desired telephone number from said plurality of telephone numbers included in said telephone directory list displayed on said display means;
   data converting means for converting data stored in said storage means corresponding to said desired telephone number selected by said selecting means into numerical audio data for allowing voicing of said desired telephone number; and
   transmitting means for transmitting said numerical audio data converted by said data converting means to a distinct communication apparatus.

2. The portable wireless device according to claim 1, wherein said telephone directory list, further includes names corresponding to said plurality of telephone numbers, and said telephone numbers and said corresponding names are displayed on said display means.

3. The portable wireless device according to claim 1, wherein said selecting means includes an operation key which can be rotated and actuated, and said operation key is rotated to select said desired telephone number from said part of said telephone directory list displayed on said display means and acuated to finalize the selection of said desired telephone number.

4. The portable wireless device according to claim 3, wherein said operation key includes a disk member partially projecting to an outside of a body of said portable wireless device.

5. The portable wireless device of claim 1, wherein said transmitting means transmits said numerical audio data converted by said data converting means to both a distinct communication apparatus and a speaker of the portable wireless device so that the voiced telephone number is heard by a user of the device.

6. The portable wireless device of claim 1, wherein the numerical audio data includes audio data representing names of numerals from 0 to 9.

* * * * *